United States Patent
Patil et al.

(10) Patent No.: US 9,455,917 B2
(45) Date of Patent: Sep. 27, 2016

(54) SIMPLIFIED APPROACH TO VERIFY LFAS IN DEPLOYMENT

(71) Applicant: Telefonaktiebolaget L M Ericsson (publ), Stockholm (SE)

(72) Inventors: Vasant Patil, San Jose, CA (US); Uma S. Chunduri, Fremont, CA (US); Wenhu Lu, San Jose, CA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 240 days.

(21) Appl. No.: 14/288,217

(22) Filed: May 27, 2014

(65) Prior Publication Data

US 2015/0350060 A1   Dec. 3, 2015

(51) Int. Cl.
- *H04L 12/26* (2006.01)
- *H04L 12/803* (2013.01)
- *H04L 12/707* (2013.01)
- *H04L 12/721* (2013.01)
- *H04L 12/705* (2013.01)

(52) U.S. Cl.
CPC ............ *H04L 47/122* (2013.01); *H04L 45/22* (2013.01); *H04L 45/12* (2013.01); *H04L 45/18* (2013.01)

(58) Field of Classification Search
CPC ................. H04L 45/18; H04L 45/22
See application file for complete search history.

(56) References Cited

U.S. PATENT DOCUMENTS

| | | | |
|---|---|---|---|
| 2008/0008104 A1* | 1/2008 | Previdi | H04L 12/66 370/255 |
| 2012/0051212 A1* | 3/2012 | Xu | H04L 41/0659 370/223 |
| 2015/0222545 A1* | 8/2015 | Sarkar | H04L 45/122 370/238 |

OTHER PUBLICATIONS

"Network Functions Virtualisation (NFV); Architectural Framework," ETSI GS NFV 002 v1.1.1, European Telecommunications Standards Institute 2013, Oct. 2013, 21 pages.
"OSPFv2 Loop-Free Alternate Fast Reroute," IP Routing: OSPF Configuration Guide, Cisco IOS Release 15S, Jul. 12, 2011, retrieved from <http://www.cisco.com/c/en/us/td/docs/ios-xml/ios/iproute_ospf/configuration/xe-3s/iro-lfa-frr-xe.pdf> on Jul. 30, 2015, pp. 1-10.
"Transmission Control Protocol, DARPA Internet Program Protocol Specification," Network Working Group, Request for Comments: 793, Sep. 1981, 91 pages.
Malkin, "RIP Version 2," Network Working Group, Request for Comments: 2453, The Internet Society, Nov. 1998, 39 pages.

(Continued)

*Primary Examiner* — Chi H Pham
*Assistant Examiner* — Fahmida Chowdhury
(74) *Attorney, Agent, or Firm* — Patent Portfolio Builders, PLLC

(57) ABSTRACT

A method and system are provided to install a loop free alternative (LFA) next hop as a backup for a primary path next hop for an interior gateway protocol (IGP). The method enables testing of the LFA next hop to ensure proper handling of data forwarding on the LFA. The method includes receiving a trigger message from an administrative module indicating a switch to the LFA next hop the message including a prefix and an interface. A check is made whether a set of primary path next hops of the prefix have been exhausted. A next primary path next hop is selected from the set of primary path next hops of the prefix. A check is made whether the next primary path next hop matches the interface. The next primary path next hop is replaced by installing the LFA next hop into a global routing information base.

20 Claims, 8 Drawing Sheets

(56) References Cited

OTHER PUBLICATIONS

Nadeau, et al., "SDN: Software Defined Networks, Foreword by David Ward," Safari Books Online, Mar. 22, 2013, retrieved from <http://proquest.safaribooksonline.com/book/networking/9781449342425/9dot-building-an-sdn-framework/ietf_sdn_framework_open_parenthesis_s_cl_html?query=((ABNO))#X2ludGVybmFsXOhObWxWaWV3P3htbGlkPTk30DEONDkzNDIOMjU1MkZwcjAOX2hObWwmcXVlcnk9cHJvdGVjdGlvbg==> on Jul. 29, 2015, 7 pages.

Socolofsky, et al., "A TCP/IP Tutorial," Network Working Group, Request for Comments: 1180, Jan. 1991, 28 pages.

Ali, Z., et al., ""Node-ID Based Resource Reservation Protocol (RSVP) Hello: A Clarification Statement,"", *Network Working Group, Request for Comments: 4558, Category: Standards Track*, Jun. 2006, 8 pages.

Andersson, L., et al., "LDP Specification", *Network Working Group, Request for Comments: 5036*, Oct. 2007, 135 pages.

Awduche, et al., "RSVP-TE: Extensions to RSVP for LSP Tunnels", *Network Working Group Request for Comments: 3209*, Dec. 2001, 61 pages, The Internet Society.

Babiarz, J., et al., "Configuration Guidelines for DiffServ Service Classes", *Network Working Group, Request for Comments: 4594, The Internet Society*, (Aug. 2006), 57 pages.

Baker, F., "A Differentiated Services Code Point (DSCP) for Capacity-Admitted Traffic", *Internet Engineering Task Force (IETF), Request for Comments: 5865, IETF Trust*, (May 2010), 14 pages.

Baker, F., et al., "Management Information Base for the Differentiated Services Architecture", *Network Working Group, Request for Comments: 3289, The Internet Society*, (May 2002), 116 pages.

Berger, et al., "Generalized Multi-Protocol Label Switching (GMPLS) Signaling", *RFC3473.txt, IETF Standard, Internet Engineering Task Force, IETF, CH*, Jan. 2003, XP015009256: ISSN: 0000-0003, the whole document, 44 pages.

Bernet, Y., et al., "An Informal Management Model for Diffserv Routers", *Network Working Group, Request for Comments: 3290, The Internet Society*, (May 2002), 56 pages.

Black, D., "Differentiated Services and Tunnels," Oct. 2000, 14 pages, *Network Working Group, Request for Comments: 2983, The Internet Society*.

Black, D., et al., "Per Hop Behavior Identification Codes," Jun. 2001, 8 pages, *Network Working Group, Request for Comments: 3140, The Internet Society*.

Blake, S., et al., "An Architecture for Differentiated Services," Dec. 1998, 36 pages, *Network Working Group, Request for Comments: 2475, The Internet Society*.

Braden, R., et al., ""Resource ReSerVation Protocol (RSVP)—Version 1 Functional Specification,"", *Network Working Group, Request for Comments: 2205*, Sep. 1997, 113 pages.

Chan, K., et al., "Differentiated Services Quality of Service Policy Information Base", *Network Working Group, Request for Comments: 3317, The Internet Society*, (Mar. 2003), 96 pages.

Charny, A., et al., "Supplemental Information for the New Definition of the EF PHB (Expedited Forwarding Per-Hop Behavior)", *Network Working Group, Request for Comments: 3247, The Internet Society*, (Mar. 2002), 24 pages.

Coltun, R., et al., "OSPF for IPv6", *Network Working Group, Request for Comments: 5340*, Jul. 2008, 95 pages.

Davie, B., et al., "An Expedited Forwarding PHB (Per-Hop Behavior)," Mar. 2002, 16 pages, *Network Working Group, Request for Comments: 3246, The Internet Society*.

Deering, S., et al., Internet Protocol, Version 6 (IPv6) Specification, Dec. 1998, 39 pages, *Network Working Group, Request for Comments: 2460, The Internet Society*.

Eggert, L., et al., "Unicast UDP Usage Guidelines for Application Designers," Nov. 2008, 27 pages, *Network Working Group, Request for Comments: 5405, IETF Trust and the persons identified as the document authors*.

Fenner, B., et al., "Management Information Base for the User Datagram Protocol (UDP)," Jun. 2005, 19 pages, *Network Working Group, Request for Comments: 4113, The Internet Society*.

Grossman, D., "New Terminology and Clarifications for Diffserv," Apr. 2002, 10 pages, *Network Working Group, Request for Comments: 3260, The Internet Society*.

Hedrick, C., "Routing Information Protocol", *Network Working Group, Request for Comments: 1058*, (Jun. 1988), 34 pages.

Heinanen, J., et al., "Assured Forwarding PHB Group," Jun. 1999, 11 pages, *Network Working Group, Request for Comments: 2597, The Internet Society*.

Hopps, C., "Analysis of an Equal-Cost Multi-Path Algorithm", *Network Working Group, Request for Comments: 2992, The Internet Society*, (Nov. 2000), 8 pages.

Housley, R., "Using Advanced Encryption Standard (AES) CCM Mode with IPsec Encapsulating Security Payload (ESP)," Dec. 2005, 13 pages, *Network Working Group, Request for Comments: 4309, The Internet Society*.

Kent, S., et al., "Security Architecture for the Internet Protocol," Dec. 2005, 101 pages, *Network Working Group, Request for Comments: 4301, The Internet Society*.

Kompella, et al., "Procedures for Modifying the Resource reSerVation Protocol (RSVP)", *Network Working Group, Request for Comments: 3936, The Internet Society*, (Oct. 2004), 8 pages.

Malkin, et al., "RIPng for IPv6", *Network Working Group, Request for Comments: 2080*, (Jan. 1997), 20 pages.

Nichols, K., et al., "Definition of Differentiated Services Per Domain Behaviors and Rules for their Specification," Apr. 2001, 24 pages, *Network Working Group, Request for Comments: 3086, The Internet Society*.

Nichols, K., et al., "Definition of the Differentiated Services Field (DS Field) in the IPv4 and IPv6 Headers," Dec. 1998, 20 pages, *Network Working Group, Request for Comments: 2474, The Internet Society*.

Oran, David, "OSI ISIS Intra-domain Routing Protocol", *Network Working Group, Request for Comments: 1142*, Feb. 1990, 206 pages.

Polk, et al., "A Resource Reservation Protocol (RSVP) Extension for the Reduction of Bandwidth of a Reservation Flow", *Network Working Group, Request for Comments: 4495, The Internet Society*, (May 2006), 22 pages.

Postel, J., "User Datagram Protocol," Aug. 28, 1980, 3 pages, RFC: 768.

Rekhter, Y., et al., "A Border Gateway Protocol 4 (BGP-4)", *Network Working Group, Request for Comments: 4271*, (Jan. 2006), 105 pages.

Rosen, et al., "BGP/MPLS IP Virtual Private Networks (VPNs)", *Network Working Group, Request for Comments: 4364, The Internet Society*, (Feb. 2006), 47 pages.

Shenker, S., et al., "Specification of Guaranteed Quality of Services", *Network Working Group: RFC 2212*; Sep. 1997; 20 pages.

Thaler, et al., "Multipath Issues in Unicast and Multicast Next-Hop Selection", *Network Working Group, Request for Comments: 2991, The Internet Society*, (Nov. 2000), 9 pages.

Wroclawski, J., "Specification of the Controlled-Load Network Element Service", *Network Working Group; RRC 2211*; Sep. 1997; 19 pages.

Wroclawski, J., "The Use of RSVP with IETF Integrated Services", *Network Working Group: RFC 2210*, Sep. 1997; 33 pages.

Atlas, A., et al., "Basic Specification for IP Fast Reroute; Loop-Free Alternates", *Network Working Group, RFC 5286, Standards Track*, Sep. 2008, 32 pages., 32.

Callon, R., "Use of OSI IS-IS for Routing in TCP/IP and Dual Environments", http://tools.ietf.org/rfc/rfc1195.txt; Dec. 1990; 80 pages.

Litkowski, S., et al., "Operational management of Loop Free Alternates", draft-ietf-rtgwg-lfa-manageability-03; *Routing Area Working Group*; Expires Aug. 16, 2014; 24 pages.

Moy, John T., "OSPF Version 2", *RFC 2328 (rfc2328)*. The Internet Engineering Task Force, 48377 Fremont Blvd. Suite 117, Fremont, CA 94538, USA, Apr. 1998; downloaded on Mar. 17, 2009 from http://rfc.dotsrc.org/rfc/rfc2328.html, (Apr. 1998), 246 pages.

\* cited by examiner

FIG. 6A
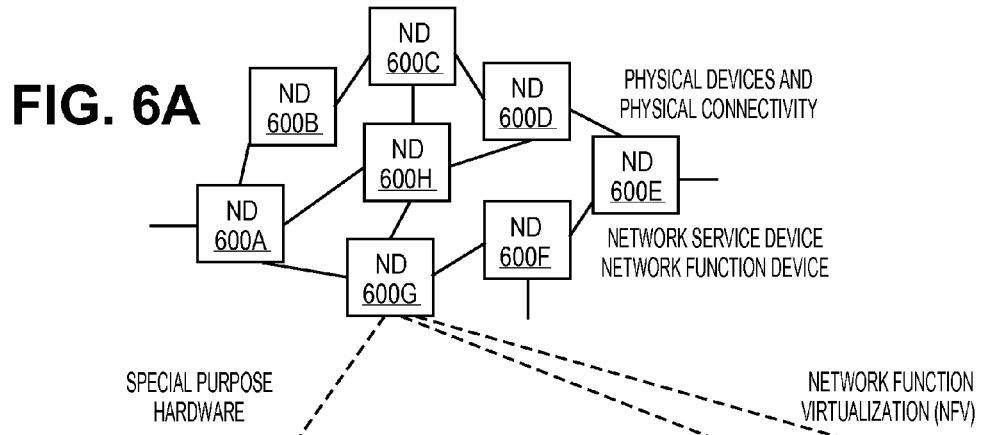
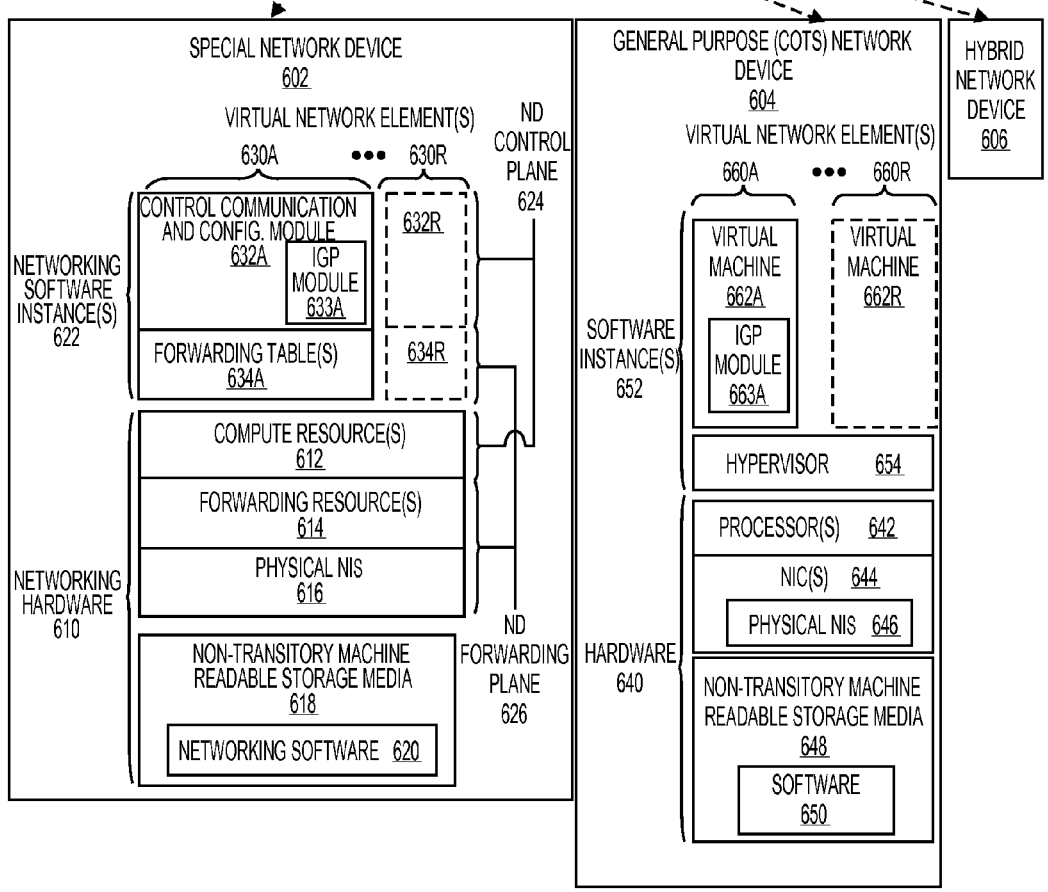
FIG. 6B

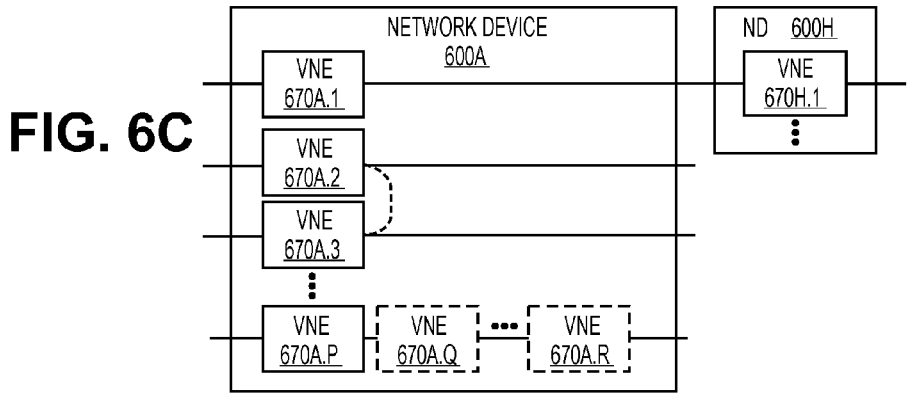
FIG. 6C
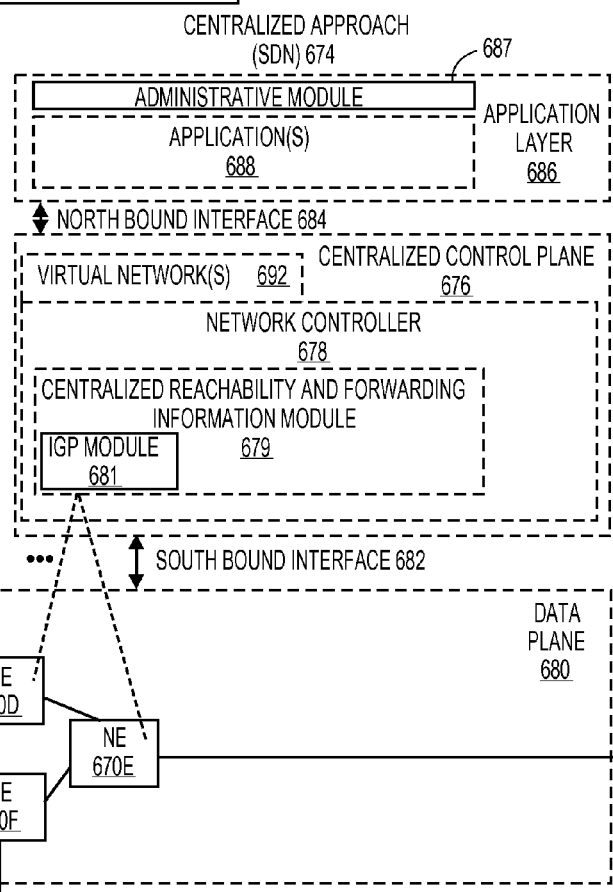
FIG. 6D
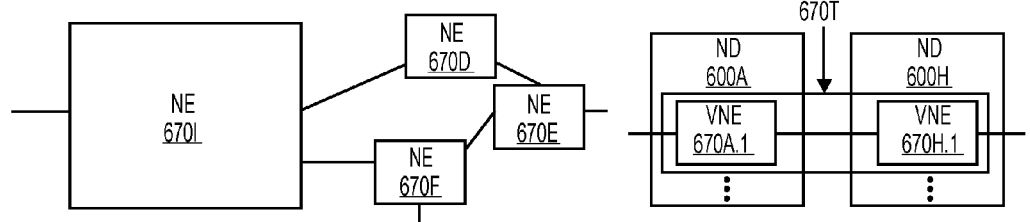
FIG. 6E     FIG. 6F

SIMPLIFIED APPROACH TO VERIFY LFAS IN DEPLOYMENT

FIELD

Embodiments of the invention relate to the field of interior gateway protocol (IGP) loop free alternative (LFA) deployment. More specifically, the embodiments relate to the testing of LFA without having to change the network topology.

BACKGROUND

An Interior Gateway Protocol (IGP) is a type of protocol used for exchanging routing information between gateways (i.e., network devices) within a network including a set of commonly controlled gateways (e.g., a set of corporate local area networks), this network can be referred to as an autonomous system. The exchanged routing information can be used to forward data across the autonomous system using network-level protocols like the Internet Protocol (IP).

Specific examples of IGPs include open shortest path first (OSPF), intermediate system to intermediate system (IS-IS), and routing information protocol (RIP). IGPs are not responsible for routing or exchanging routing information outside of their respective autonomous systems. Exterior or border gateway protocols are used to exchange routing information between autonomous systems and rely on IGPs to resolve routes within an AS.

The IGPs determine a set of paths from each network device in the autonomous system to each other network device in the autonomous system. A primary path is determined at each network device and the next hop to the destination is installed in the forwarding tables of the network device. However, in the case of failure of a next hop or link a secondary or alternative path is also determined to be utilized in the case of failure until the network device can recalculate a primary path based on the changed topology of the network. RFC 5286 [Basic Specification for IP Fast Reroute: Loop Free Alternatives] lays out a method to compute Loop Free Alternatives (LFA) that is applicable to Interior Gateway Protocols (IGPs) such as the intermediate system-intermediate system (IS-IS) protocol and the open shortest path first (OSPF) protocols. RFC 5286 defines a set of criteria that a next hop link or next hop must meet to be eligible and selected as a next hop for an LFA path.

Once installed however, to test the LFA path an operator must trigger the LFA with a physical interface 'shut down' or similarly manually shut down the interface associated with a primary path to force the use of the LFA. Alternatively, a fully computerized network simulation can be used to determine how an LFA is selected and handled in case of failure. The first method is disruptive to the network and the second method is too costly for many operators to implement.

SUMMARY

A method is implemented by a network device in a network having a plurality of nodes. The method installs a loop free alternative (LFA) next hop as a backup for a primary path next hop for an interior gateway protocol (IGP). The method enables testing of the LFA next hop to ensure proper handling of data forwarding on the LFA. The method includes receiving a trigger message from an administrative module indicating a switch to the LFA next hop the message including a prefix and an interface. A check is made whether a set of primary path next hops of the prefix have been exhausted. A next primary path next hop is selected from the set of primary path next hops of the prefix. A check is made whether the next primary path next hop matches the interface. The next primary path next hop is replaced with the LFA next hop by installing the LFA next hop into a global routing information base.

A network device in a network having a plurality of nodes is configured to execute a method to install a loop free alternative (LFA) next hop as a backup for a primary path next hop for an interior gateway protocol (IGP). The method enables testing of the LFA next hop to ensure proper handling of data forwarding on the LFA. The network device comprises a non-transitory machine-readable storage medium to store an IGP module and a network processor communicatively coupled to the non-transitory machine-readable storage medium. The network processor executes the IGP module. The IGP module is configured to receive a trigger message from an administrative module indicating a switch to the LFA next hop the message including a prefix and an interface, to check whether a set of primary path next hops of the prefix have been exhausted. A next primary path next hop is from the set of primary path next hops of the prefix. The IGP module further checks whether the next primary path next hop matches the interface and replaces the next primary path next hop with the LFA next hop by installing the LFA next hop into a global routing information base.

A control plane device is configured to implement at least one centralized control plane for a software defined network (SDN). The centralized control plane is configured to execute a method to install a loop free alternative (LFA) next hop as a backup for a primary path next hop for an interior gateway protocol (IGP). The method enables testing of the LFA next hop to ensure proper handling of data forwarding on the LFA. The control plane device comprises a non-transitory storage medium to store centralized control plane software and an IGP module and a processor. A processor is communicatively coupled to the non-transitory storage medium. The processor is configured to execute the control plane software to implement the IGP module. The IGP module is configured to receive a trigger message from an administrative module indicating a switch to the LFA next hop. The message includes a prefix and an interface. A check is made whether a set of primary path next hops of the prefix have been exhausted. Then the IGP module selects a next primary path next hop from the set of primary path next hops of the prefix, checks whether the next primary path next hop matches the interface, and replaces the next primary path next hop with the LFA next hop by installing the LFA next hop into a global routing information base.

A computing device implements a plurality of virtual machines for implementing network function virtualization (NFV). A virtual machine from the plurality of virtual machines is configured to execute a method to install a loop free alternative (LFA) next hop as a backup for a primary path next hop for an interior gateway protocol (IGP). The method enables testing of the LFA next hop to ensure proper handling of data forwarding on the LFA. The computing device comprises a non-transitory storage medium to store an IGP module and a processor communicatively coupled to the non-transitory storage medium. The processor is configured to execute the IGP module. The IGP module is configured to receive a trigger message from an administrative module indicating a switch to the LFA next hop the message including a prefix and an interface. The IGP module checks whether a set of primary path next hops of the prefix have been exhausted, selects a next primary path next hop from the set of primary path next hops of the prefix, checks whether the next primary path next hop matches the interface, and replaces the next primary path next hop with the LFA next hop by installing the LFA next hop into a global routing information base.

BRIEF DESCRIPTION OF THE DRAWINGS

The invention may best be understood by referring to the following description and accompanying drawings that are used to illustrate embodiments of the invention. In the drawings:

FIG. 6A illustrates connectivity between network devices (NDs) within an exemplary network, as well as three exemplary implementations of the NDs, according to some embodiments of the invention.

FIG. 6B illustrates an exemplary way to implement the special-purpose network device 602 according to some embodiments of the invention.

FIG. 6C illustrates various exemplary ways in which virtual network elements (VNEs) may be coupled according to some embodiments of the invention.

FIG. 6D illustrates a network with a single network element (NE) on each of the NDs of FIG. 6A, and within this straight forward approach contrasts a traditional distributed approach (commonly used by traditional routers) with a centralized approach for maintaining reachability and forwarding information (also called network control), according to some embodiments of the invention.

FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention.

DESCRIPTION OF EMBODIMENTS

Figure 1:
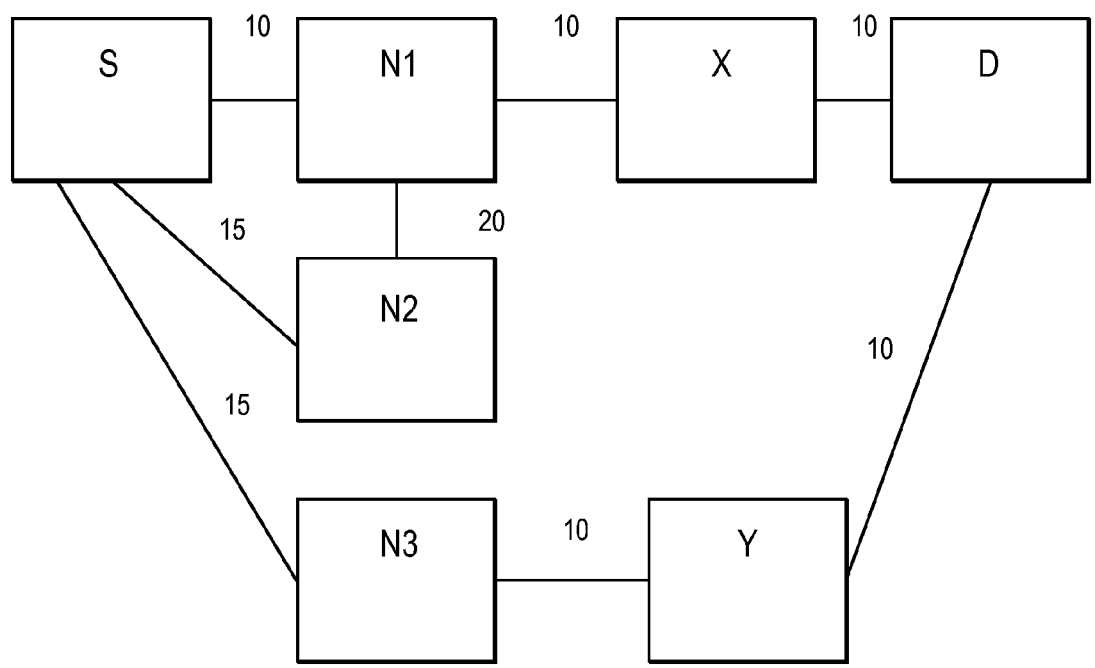
FIG. 1 is a diagram of one embodiment of an example network topology.

The following description describes methods and apparatus for computation and verification of LFA for an interior gateway protocol (IGP) in an autonomous system. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The processes for calculating the LFA for autonomous systems described herein below can be applied for Internet Protocol version 4 (IPv4) and/or Internet Protocol version 6 (IPv6) routes and topologies. The process can be applied to each (IPv4 and IPv6) in any order or in parallel. The processes for handling each (IPv4 and IPv6) are similar and for sake of clarity are not separately addressed.

FIG. 1 is a diagram of one embodiment of an example network topology of an autonomous system or similar network. The example network is used in reference for the description of various embodiments and to explain the drawbacks of the prior art. In the illustrated network topology, each node is represented with a corresponding name or label (e.g., S, N1 and Y) and the link costs are represented above each link connecting two nodes. In this example it is assumed that all link costs are bi-directional.

After primary shortest path first (SPF) computation at the source node (S), a path has been determined to reach destination node D where the next hop is intermediate node N1 and the total cost is of this primary path to the destination node D is 30. The metric for link cost can be any metric such as latency, distance, bandwidth or similar metric. Thus, at source node s, the forwarding table includes an entry: D→N1 (cost 30), where the '→' indicates that the next hop to the destination D is N1. RFC 5286 defines a set of conditions or criteria for identifying a loop free alternative (LFA) path and next hop. One of the conditions is the basic loop free condition which can be expressed as:

$$(N,D)<(N,S)+(S,D)$$

Where each pair such as (N, D) represents a optimal distance value, such that the condition requires in this case, that the distance from a next hop N to the destination node D is less than the total distance of the next hop to the source and the source to the destination. This condition ensures that a qualifying path does not have any loop.

Anther condition for an LFA is a node protection Condition, which can be expressed as:

$$(N,D)<(N,E)+(E,D)$$

(where E is the primary next hop (i.e., the next hop of the primary path) of the Destination).

This condition ensures that the qualifying LFA provides node protection relative to the primary path.

In the example topology, the neighboring node N2 can only offer Link protection (40<15+30, RFC 5286 inequality-1) to D as node protection equation above is not satisfied (40<20+20, RFC 5286 inequality-3). In contrast, neighboring node N3 can offer Link protection (20<15+30) to D and node protection (20<25+20); as both equations above are satisfied. The accuracy of this is readily apparent from the illustration. With default LFA configuration options (per RFC 5286) on the link from the source node S to the intermediate node N1, its possible destination D will have intermediate node N3 as the alternative next hop of its LFA, because N3 provides better protection. Specifically, N3 provides node protection, while N2 only provides link protection. However, for administrative reasons (e.g., a bandwidth issue on the link between the source node S and the intermediate node N3, node N2's stability issues, or similar reasons) an operator can choose N2 as the next hop of an LFA by adjusting the configuration option to allow link-only protection or the operator can adjust the link costs. An operator can seek to verify that this computed alternative is not causing any traffic loops in a multi-vendor deployments; without the process described herein below any such verification would be disruptive to the network or require elaborate computer simulation.

Figure 2:
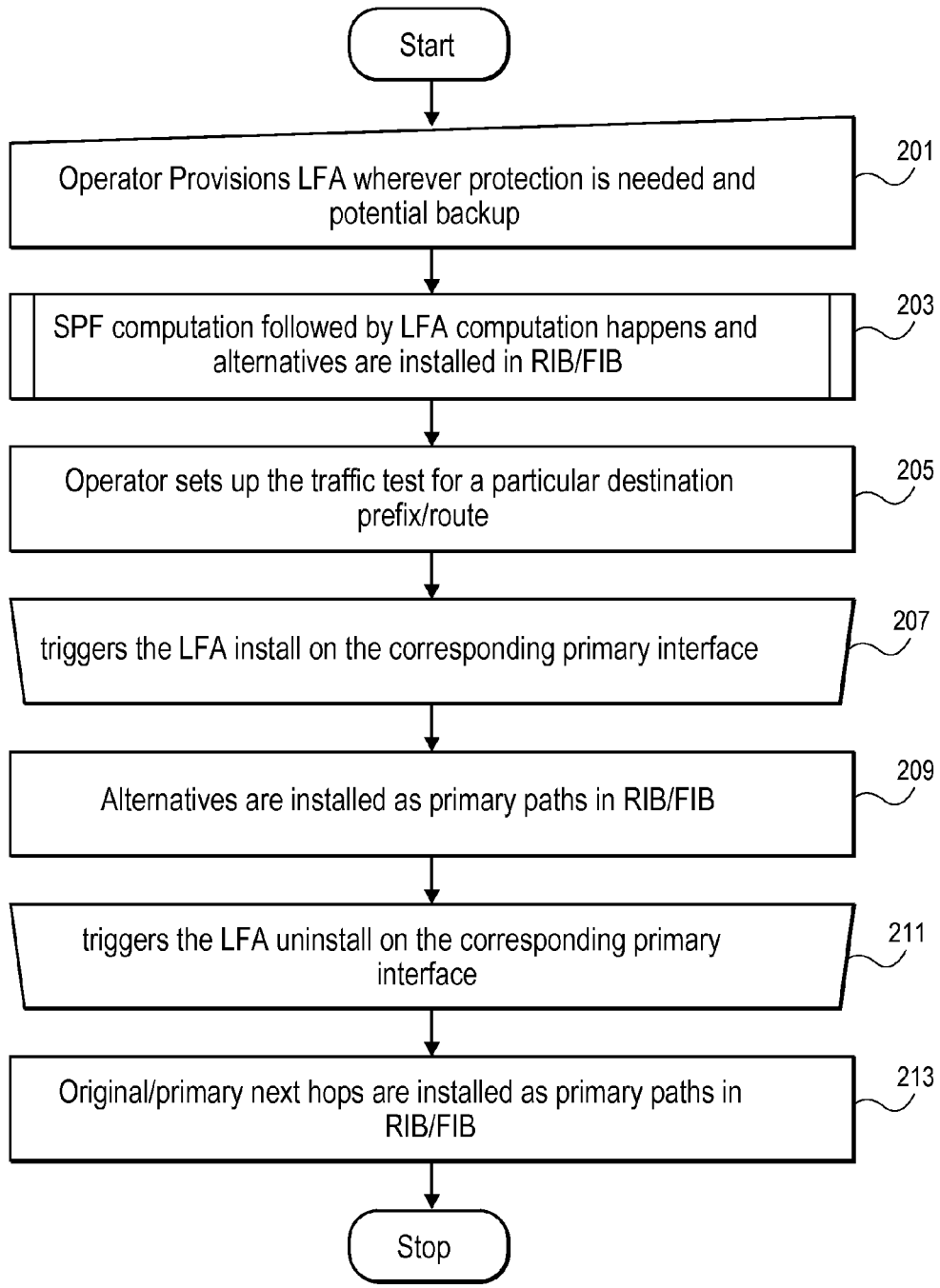
FIG. 2 is a flowchart of one embodiment of a LFA provisioning and computation process for routes in a network or autonomous system.

FIG. 2 is a flowchart of one embodiment of a process for provisioning LFA configuration. LFA computation is part of an overall process for building a forwarding table for the handling of data traffic within an autonomous system, network domain or similar network configuration. The IGP process first exchanges link state information that enables all of the nodes within the network to determine the topology of the network. Using this topology a set of paths from each node to every other node are determined and the optimal next hops of these paths is recorded in the forwarding tables of the respective network nodes, which are each network devices. The paths and their next hops are the primary paths to their respective destinations. With the primary destinations determined, the process then determines alternative paths, in this case LFAs to be utilized in case of failure along the primary path. Whenever LFA computation is done i.e., while forming the Shortest Path Tree (SPT), rooted at each neighbor of a source node, for each destination encountered, a check of the inequalities is made as specified in RFC 5286 (per operator policy and as applicable from inequality 1 to 4).

The illustrated process takes place before and during the LFA computation process. The process begins with the operator provisioning LFA wherever protection is needed and where potential backup is required (Block 201). The operator can specify which destinations, links, nodes or similar aspects require backup and/or protection. This takes place before the LFA computation. The operator can implement the provisioning via administrative software that can be executed locally or remotely to the network devices affected. The provisioning can be done on an interface by interface basis, where an interface is an outbound link to a neighboring node.

For the example network above, it would be cumbersome to validate the LFA provisioning on the fly (to determine whether the selection caused any traffic forwarding loops), the ability to install the alternate next hop in the forwarding (FIB) with a simple command is introduced herein to assist with this implementation. Using administrative software or interface, the LFA configuration options can be set to link-only in the above example, and the operator can choose to install the alternate in FIB and send traffic to see if it is indeed taking the alternate next hop and path to intermediate node N2. With this change to have an alternate path and next hop in FIB, the rest of the network won't see any change in the network. However, this would not necessarily be true if the operator forcibly shut down the primary link or mimicked any other triggers. It's also possible this configuration can, using the command described in this document, just be used to test loops in pre-deployment once the LFA computation is done by picking a particular destination. The provisioning for the LFA can be done by introducing a command line interface (CLI) command or similar input option. An example CLI comment with some example syntax is:

trigger<IGP Module>lfa<instance><prefix/len><intf><address-family>[install|uninstall]

→'install' keyword at the end of the command will force the IGP (i.e., IS-IS/OSPF) instance to install only the lfa of the interface (<intf>) as the primary next hop for destination D.

→'uninstall' keyword at the end of the command will revert back the action and install the original primary next hop and LFA next hop into FIB.

One skilled in the art would understand that a CLI command or set of CLI commands is one embodiment for implementing the provisioning, while other embodiments would encompass graphical user interface provisioning or similar administrative software. Once the LFA provisioning has been input, the primary shortest path first (SPF) computation can take place and this is followed by the LFA computation with the results of each of the computation being stored in the respective routing information base (RIB) and/or forwarding information base (FIB) (Block 203). Per the network configuration and LFA options (e.g., link-only, node-only, equal cost multi-path, and local or remote alternative preferences), the LFA computation will generate the best possible alternative path and next hop.

The operator can then set up a traffic test for a particular destination node and using a particular prefix or route (Block 205). The operator can test the computed alternative path is not causing any traffic forwarding loops by sending traffic to a particular destination with monitoring to determine whether there is any packet loss. The test can be configured on the interface in one embodiment using the CLI trigger command as described above. The command will replace the primary next hop of the specified destination prefix with the computed alternative LFA next hop. This or similar mechanisms can be utilized to trigger the LFA next hop installation on the desired interface (Block 207) causing the alternative next hops to be installed as the primary path next hop in the routing information base or forwarding information base (RIB/FIB) (Block 209).

At this point the traffic test commences and can continue for any desired time. The operator can end the test and revert the configuration back to the original primary path next hop by disabling the alternative path using an uninstall command, such as the uninstall CLI command described above, or similar function to remove the alternative path and next hop from the routing information base for the given interface (Block 211). The execution of the command will result in the reinstallation of the original primary path next hop in the routing information base and/or forwarding information base (Block 213).

In other embodiments, the process can support setting up a test for a particular interface without specifying a destination prefix. In this case the primary next hop for all destinations using the interface will be replaced with their respective alternate next hops and paths determined via the LFA computation. The process can be used in conjunction with any IGP protocol including IS-IS and OSPF. The process enables the verification of computed alternative paths without causing or mimicking an actual failure scenario for an interface or remote node that may cause network wide disruption, but nonetheless providing a means for testing the computed LFA paths.

Figure 3:
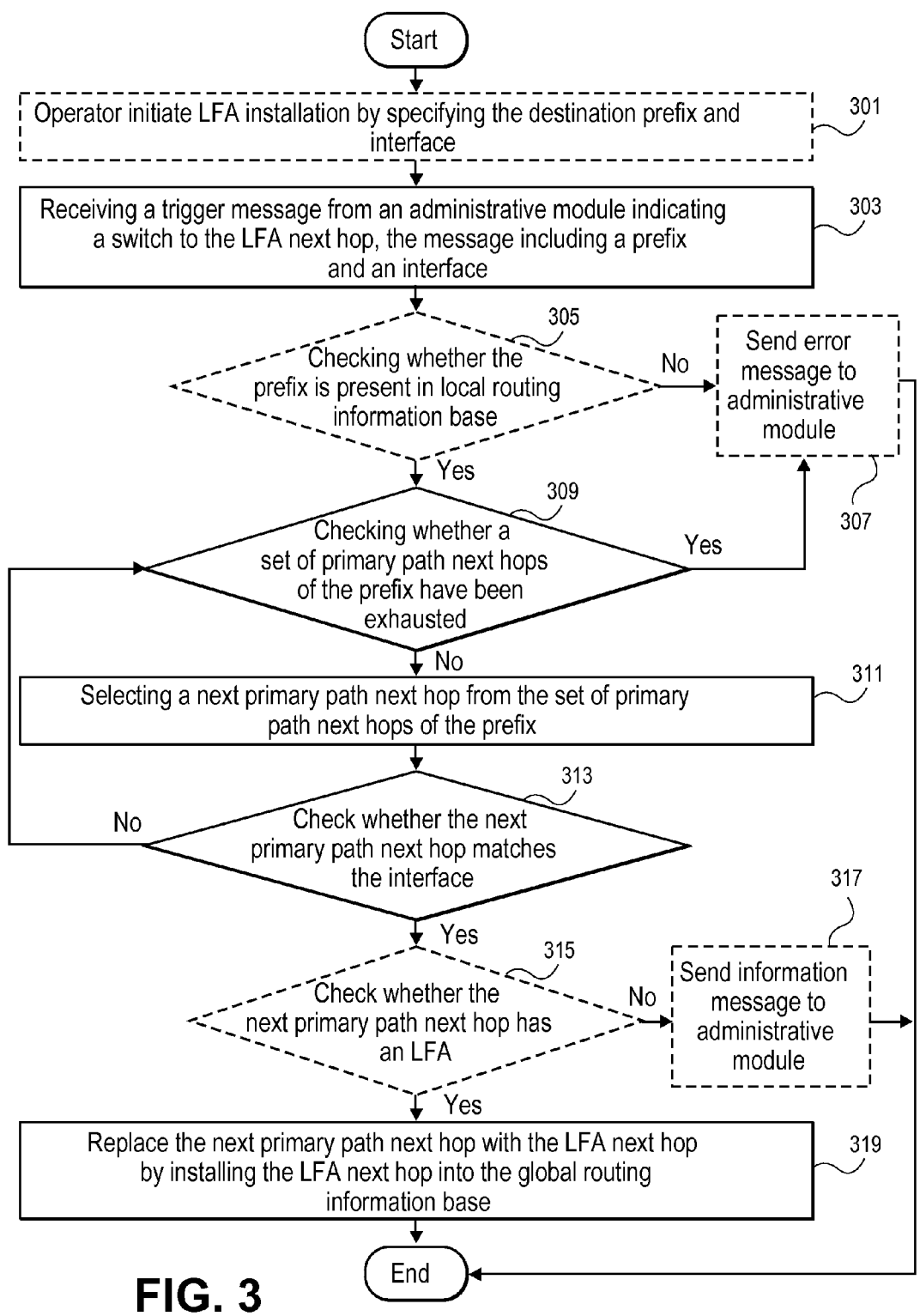
FIG. 3 is a flowchart of one embodiment of a process for LFA verification.

FIG. 3 is a flowchart of one embodiment of a process for implementing the LFA verification process by a network device. In one embodiment, the process is initiated in response to an operator initiating an LFA installation for purposes of testing that specifies a destination node using a prefix and specifying an outbound link using an interface (Block 301). This causes a trigger message to be sent to the IGP module managing the network device (Block 303). The operator utilizes an administrative module to input the data and send the trigger message that causes the switch to the LFA next hop where the message also includes the input prefix and interface. The administrative module can be a function or set of functions operating at the network device or remote from the network device. The functions can be utilized via a command line interface as discussed above or through any type of graphical user interface or similar interface. The trigger message can be a discrete message transmitted using any protocol to the IGP module or can be a set of parameters directly passed to the IGP module.

In one optional embodiment, the process receives the trigger message and checks whether the specified prefix is present in the routing information base (Block 305). If the prefix is not found in the routing information base then the process sends an error reply to the operator via the administrative module (Block 307). If the prefix is present, then the process checks whether a set of primary path next hops associated with the prefix in the routing information base have been exhausted (Block 309). The process will iterate through each of the path associated with the prefix to switch each to the respective LFA next hop. If the set is initially empty or on subsequent iterations becomes empty, then the process sends an error message to the administrative module (Block 307).

If the set of primary path next hops is not empty, then the process selects a next primary path next hop from the set of primary path next hops associated with the designated prefix (Block 311). The set can be processed in any order. A check is made whether the selected next primary path next hop matches to interface that has been specified (Block 313). If the primary path next hop does not match the interface, then the process proceeds to check if additional nodes are present in the set (Block 309) and selects the next node (Block 311). If the selected next hop does match the interface, then the process optionally checks wither the selected next hop is an LFA (Block 315). If the selected next hop is not a valid LFA, then the process sends an information message to the administrative module regarding the selected next hop (Block 317). If the selected next hop is a valid LFA or the check is not made, then the process replaces the next hop with the LFA next hop by installing the LFA next hop into the global routing information base (Block 319). Thus, the switch to the alternative next hop of the LFA is implemented.

One skilled in the art would understand that a similar process for uninstalling the LFA and restoring the original primary path next hop into the global routing information base. The process can thus be utilized by an operator to provide a method of verifying the correct functionality of a set of computed LFA next hops without having to cause disruption to the network in which the network device resides and without requiring expensive network simulations.

Figure 4:
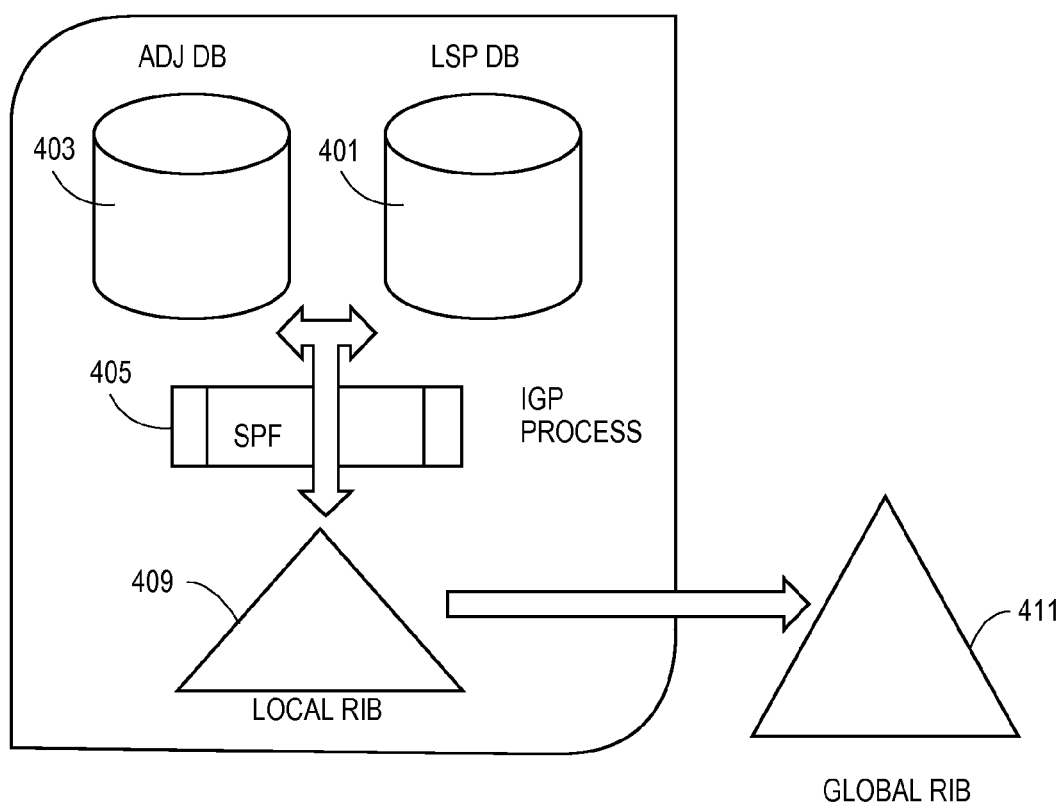
FIG. 4 is a diagram of the basic components of the IGP process.

FIG. 4 is a diagram of the basic components of the IGP process. The components of the network device that are utilized in the IGP process include an adjacency (ADJ) database 403, a link state protocol (LSP) database 401, a shortest path first (SPF) 405 or similar routing process, and a local RIB 409. The adjacency database 403 tracks adjacency information received from neighboring nodes connected through the physical ports and links of the network device. The link state protocol database 401 tracks the topology of the autonomous system or similar network in which the network device is situated, which is based on exchange of link state packets. A shortest path first 405 or similar route computation algorithm processes the link state protocol database 401 to determine forwarding information that is stored in the local routing information base 409. In some embodiments, the local routing information base is synchronized or downloaded to a global routing information base 411 that is shared by all components of the network device such as line cards and similar components or that may be shared with other network devices in the network.

Figure 5:
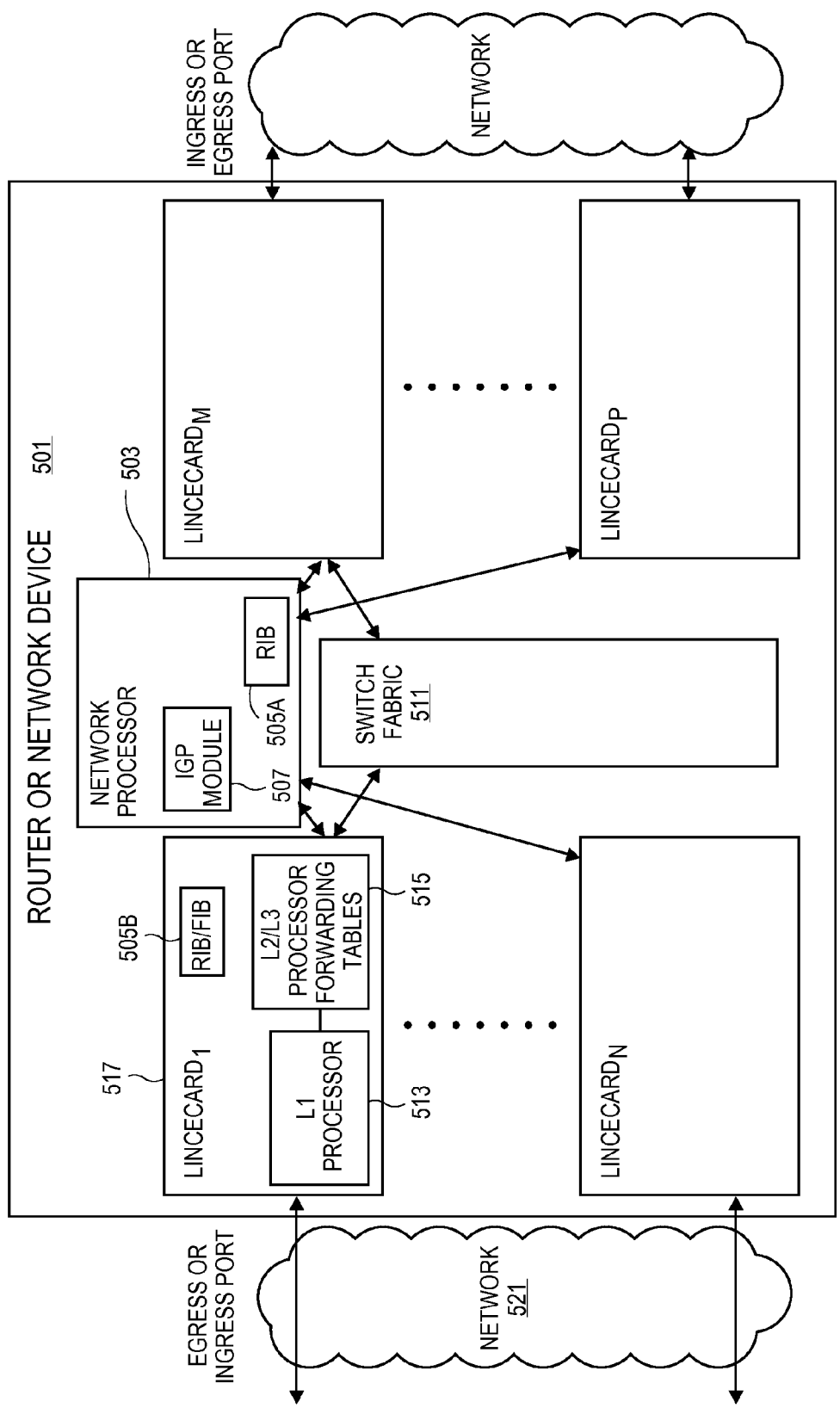
FIG. 5 is a diagram of one embodiment of a network device implementing the LFA verification process in an IGP network area.

FIG. 5 is a diagram of one embodiment of a network device implementing the LFA computation process for default routes in an autonomous system or similar network.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 501 or network device or similar computing device. The router 501 can have any structure that enables it to receive data traffic and forward it toward its destination. The router 501 can include a network processor 503 or set of network processors that execute the functions of the router 501. A 'set,' as used herein, is any positive whole number of items including one item. The router 501 or network element can execute IGP process functionality via a network processor 503 or other components of the router 501.

The IGP process functions can be implemented as modules in any combination of software, including firmware, and hardware within the router. The functions of the IGP process that are executed and implemented by the router 501 include those described further herein above.

In one embodiment, the router 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the routing information base or forwarding information base 505B, or a relevant subset thereof. The line cards 517 can also implement or facilitate the IS-IS process functions described herein above. The line cards 517 are in communication with one another via a switch fabric 511 and communicate with other nodes over attached networks 521 using Ethernet, fiber optic or similar communication links and media.

In other embodiments, the processes can be implemented by a split-architecture node, where the control plane is remote from the data/forwarding plane. In this case, the IGP process can be carried out at any combination of the data plane nodes and the central controller.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link) An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). The IGP module 633A implements the processes described herein above as part of the Control communication and Configuration Module 632A or similar aspect of the networking software, which may be loaded and stored in the non-transitory machine readable media 618A or in a similar location.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R. In one embodiment, the virtual machines 632A-R may execute the described IGP module 663A and related software described herein above.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 6C illustrates various exemplary ways in which VNEs may be coupled according to some embodiments of the invention. FIG. 6C shows VNEs 670A.1-670A.P (and optionally VNEs 680A.Q-680A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 172 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane CA80 over the south bound interface 682 (which may use the OpenFlow protocol). Thus, the network intelligence is centralized in the centralized control plane 676 executing on electronic devices that are typically separate from the NDs. In one embodiment, the centralized reachability and forwarding information module 679 may include the IGP module 681 and related software as described herein above. In addition, in some embodiments, an administrative module 687 providing an interface for an operator to configure the LFA paths and test the LFA paths can be implemented in the application layer 686. In other embodiments the administrative module 687 can be implemented local to the IGP module 681 or in any location in communication with the IGP module 681.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 174 can be implemented with the general purpose network device 604 (e.g., each of the VNE 'XA60A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 6A60A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
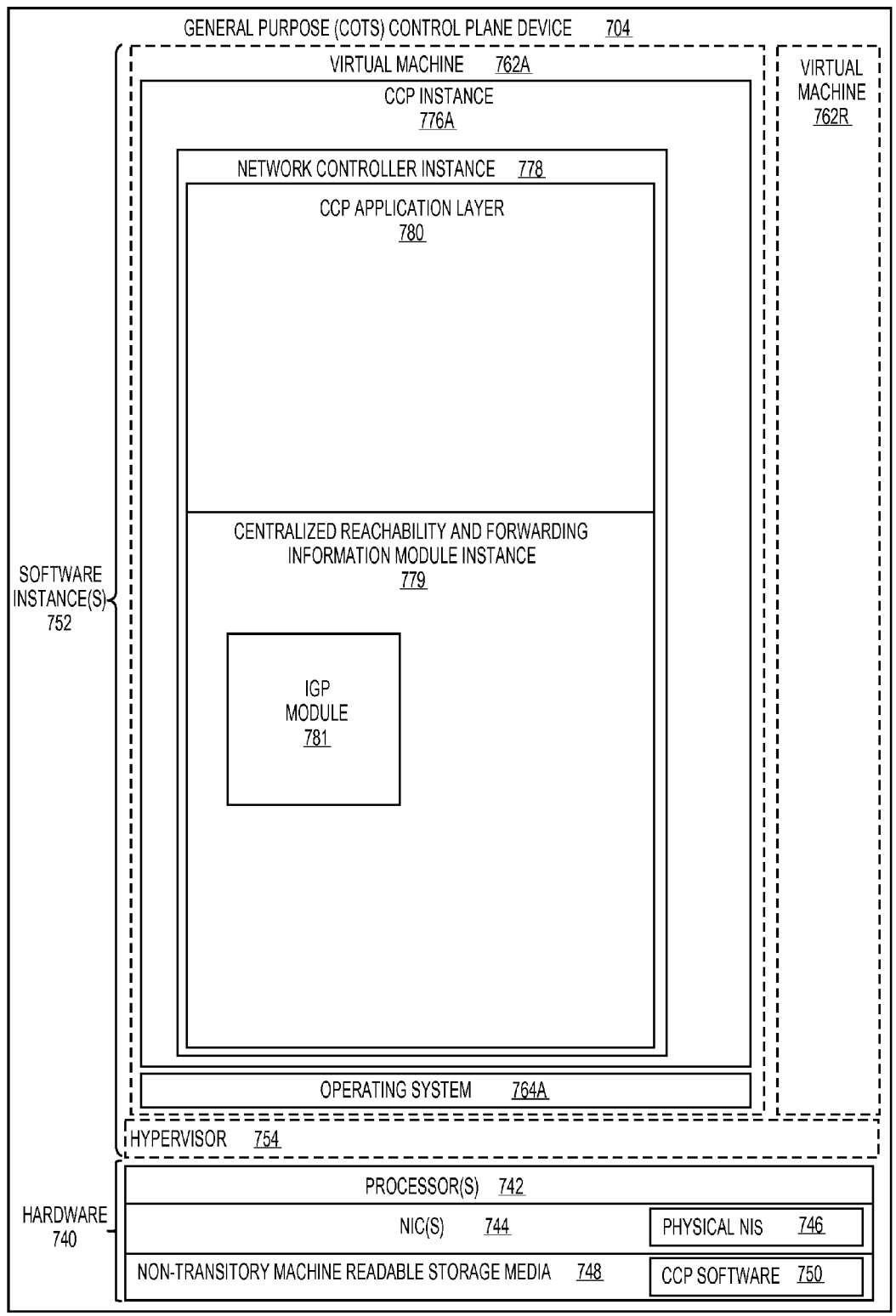
FIG. 7 illustrates a general purpose control plane device 704 including hardware 740 comprising a set of one or more processor(s) 742 (which are often Commercial off-the-shelf (COTS) processors) and network interface controller(s) 744 (NICs; also known as network interface cards) (which include physical NIs 746), as well as non-transitory machine readable storage media 748 having stored therein centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 678 to the operating system 764A and communicating with the various NEs), and an CCP application layer 780 (sometimes referred to as an application layer) over the middleware layer (providing the intelligence required for various network operations such as protocols, network situational awareness, and user-interfaces). In one embodiment, the centralized reachability and forwarding information module 779 may include the IGP module 781 and related software as described herein above.

At a more abstract level, this CCP application layer 780 within the centralized control plane 676 works with virtual network view(s) (logical view(s) of the network) and the middleware layer provides the conversion from the virtual networks to the physical view.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device in a network having a plurality of nodes, the method to install a loop free alternative (LFA) next hop as a backup for a primary path next hop for an interior gateway protocol (IGP), where the method enables testing of the LFA next hop to ensure proper handling of data forwarding on the LFA, the method comprising the steps of:
    receiving a trigger message from an administrative module indicating a switch to the LFA next hop, the trigger message including a prefix and an interface;
    checking whether a set of primary path next hops of the prefix have been exhausted;
    selecting a next primary path next hop from the set of primary path next hops of the prefix;
    checking whether the next primary path next hop matches the interface;
    replacing the next primary path next hop with the LFA next hop by installing the LFA next hop into a global routing information base; and
    uninstalling the LFA next hop from the global routing information base after a designated time or in response to a message from the administrative module.

2. The method of claim 1, further comprising the steps of:
    checking whether the prefix is present in a local routing information base; and
    sending an error message to the administrative module when the prefix is not present in the local routing information base.

3. The method of claim 1, further comprising the steps of:
    checking whether the next primary path next hop has the LFA; and
    sending an information message to the administrative module when there is no LFA for the next primary path next hop.

4. The method of claim 1, wherein the IGP is for internet protocol (IP) version 4.

5. The method of claim 1, wherein the IGP is for internet protocol (IP) version 6.

6. The method of claim 1, wherein the IGP is intermediate system to intermediate system (IS-IS).

7. The method of claim 1, wherein the IGP is open shortest path first (OSPF).

8. A network device in a network having a plurality of nodes, the network device configured to execute a method to install a loop free alternative (LFA) next hop as a backup for a primary path next hop for an interior gateway protocol (IGP), where the method enables testing of the LFA next hop to ensure proper handling of data forwarding on the LFA, the network device comprising:
    a non-transitory machine-readable storage medium to store an IGP module; and
    a network processor communicatively coupled to the non-transitory machine-readable storage medium, the network processor to execute the IGP module, the IGP module configured to receive a trigger message from an administrative module indicating a switch to the LFA next hop, the trigger message including a prefix and an interface, to check whether a set of primary path next hops of the prefix have been exhausted, to select a next primary path next hop from the set of primary path next hops of the prefix, to check whether the next primary path next hop matches the interface, to replace the next primary path next hop with the LFA next hop by installing the LFA next hop into a global routing information base, and to uninstall the LFA next hop from the global routing information base after a designated time or in response to a message from the administrative module.

9. The network device of claim 8, wherein the network processor is configured to execute the IGP module which is further configured to check whether the prefix is present in a local routing information base, and send an error message to the administrative module when the prefix is not present in the local routing information base.

10. The network device of claim 8, wherein the network processor is configured to execute the IGP module which is further configured to check whether the next primary path next hop has the LFA, and to send an information message to the administrative module when there is no LFA for the next primary path next hop.

11. The network device of claim 8, wherein the IGP is for internet protocol (IP) version 4.

12. The network device of claim 8, wherein the IGP is for internet protocol (IP) version 6.

13. The network device of claim 8, wherein the IGP is intermediate system to intermediate system (IS-IS).

14. The network device of claim 8, wherein the IGP is open shortest path first (OSPF).

15. A control plane device configured to implement at least one centralized control plane for a software defined network (SDN), the centralized control plane configured to execute a method to install a loop free alternative (LFA) next hop as a backup for a primary path next hop for an interior gateway protocol (IGP), where the method enables testing of the LFA next hop to ensure proper handling of data forwarding on the LFA, the control plane device comprising:
    a non-transitory storage medium to store centralized control plane software and an IGP module; and
    a processor communicatively coupled to the non-transitory storage medium, the processor configured to execute the control plane software to implement the IGP module, the IGP module configured to receive a trigger message from an administrative module indicating a switch to the LFA next hop, the trigger message including a prefix and an interface, to check whether a set of primary path next hops of the prefix have been exhausted, to select a next primary path next hop from the set of primary path next hops of the prefix, to check whether the next primary path next hop matches the interface, replace the next primary path next hop with the LFA next hop by installing the LFA next hop into a global routing information base, and to uninstall the LFA next hop from the global routing information base after a designated time or in response to a message from the administrative module.

16. The control plane device of claim 15, wherein the processor is configured to execute the IGP module which is further configured to check whether the prefix is present in a local routing information base, and send an error message to the administrative module when the prefix is not present in the local routing information base.

17. The control plane device of claim 15, wherein the processor is configured to execute the IGP module which is further configured to check whether the next primary path next hop has the LFA, and to send an information message to the administrative module when there is no LFA for the next primary path next hop.

18. A computing device implementing a plurality of virtual machines for implementing network function virtualization (NFV), wherein a virtual machine from the plurality of virtual machines is configured to execute a method to install a loop free alternative (LFA) next hop as a backup for a primary path next hop for an interior gateway protocol (IGP), where the method enables testing of the LFA next hop to ensure proper handling of data forwarding on the LFA, the computing device comprising:
- a non-transitory storage medium to store an IGP module; and
- a processor communicatively coupled to the non-transitory storage medium, the processor configured to execute the IGP module, the IGP module configured to receive a trigger message from an administrative module indicating a switch to the LFA next hop, the trigger message including a prefix and an interface, to check whether a set of primary path next hops of the prefix have been exhausted, to select a next primary path next hop from the set of primary path next hops of the prefix, to check whether the next primary path next hop matches the interface, to replace the next primary path next hop with the LFA next hop by installing the LFA next hop into a global routing information base, and to uninstall the LFA next hop from the global routing information base after a designated time or in response to a message from the administrative module.

19. The computing device of claim 18, wherein the processor is configured to execute the IGP module which is further configured to check whether the prefix is present in a local routing information base, and send an error message to the administrative module where the prefix is not present in the local routing information base.

20. The computing device of claim 18, wherein the processor is configured to execute the IGP module which is further configured to check whether the next primary path next hop has the LFA, and to send an information message to the administrative module where there no LFA for the next primary path next hop.

* * * * *